United States Patent
Matsuda

(10) Patent No.: US 7,152,707 B2
(45) Date of Patent: Dec. 26, 2006

(54) VEHICLE DRIVING FORCE CONTROL APPARATUS AND METHOD

(75) Inventor: Toshiro Matsuda, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 11/145,175

(22) Filed: Jun. 6, 2005

(65) Prior Publication Data

US 2005/0284683 A1 Dec. 29, 2005

(30) Foreign Application Priority Data

Jun. 7, 2004 (JP) .............................. 2004-167913

(51) Int. Cl.
*B60K 6/04* (2006.01)
(52) U.S. Cl. ........................ 180/243; 701/89; 701/90; 180/197
(58) Field of Classification Search ................ 180/197, 180/242, 243; 701/89, 90
See application file for complete search history.

(56) References Cited

U.S. PATENT DOCUMENTS

| | | | |
|---|---|---|---|
| 5,887,670 A * | 3/1999 | Tabata et al. ............... | 180/65.2 |
| 6,419,040 B1 * | 7/2002 | Kitano et al. ................ | 180/243 |
| 6,434,469 B1 * | 8/2002 | Shimizu et al. .............. | 701/84 |
| 6,549,840 B1 | 4/2003 | Mikami et al. | |
| 6,898,505 B1 * | 5/2005 | Kadota et al. ................ | 701/71 |
| 2004/0040758 A1 * | 3/2004 | Shimizu et al. ............. | 180/65.2 |
| 2005/0150702 A1 * | 7/2005 | Matsuzaki .................... | 180/197 |
| 2005/0211489 A1 * | 9/2005 | Kowatari et al. ........... | 180/243 |

FOREIGN PATENT DOCUMENTS

| | | |
|---|---|---|
| EP | 1 110 785 A2 | 6/2001 |
| EP | 1 205 331 A2 | 5/2002 |
| EP | 1 359 041 A2 | 11/2003 |
| EP | 1 393 953 A2 | 3/2004 |
| JP | 07-231508 A | 8/1995 |
| JP | 2000-318473 A | 11/2000 |

OTHER PUBLICATIONS

U.S. Appl. No. 11/144,609, filed Jun. 6, 2005, Matsuda.
U.S. Appl. No. 11/145,186, filed Jun. 6, 2005, Masuda et al.

* cited by examiner

*Primary Examiner*—Kevin Hurley
(74) *Attorney, Agent, or Firm*—Foley & Lardner LLP

(57) ABSTRACT

There is provided a driving force control apparatus for an automotive vehicle, including an internal combustion engine to rotate main drive wheels of the vehicle by engine torque, a generator driven by the engine; a motor powered by the generator to rotate subsidiary drive wheels of the vehicle by motor torque in a four-wheel drive state, a detecting section to detect a vehicle start failure under which the vehicle has failed to make a start in response to a vehicle starting operation in the four-wheel drive state, and a motor torque characteristic changing section to change a target torque characteristic of the motor to a higher level so as to increase the motor torque upon detection of the vehicle start failure.

21 Claims, 8 Drawing Sheets

VEHICLE DRIVING FORCE CONTROL APPARATUS AND METHOD

BACKGROUND OF THE INVENTION

The present invention relates an apparatus and method for controlling the driving force of an automotive vehicle to achieve a four-wheel drive state.

Japanese Laid-Open Patent Publication No. 2000-318473 proposes one type of four-wheel drive vehicle, which has an engine drivingly connected to main drive wheels of the vehicle, a motor drivingly connected to subsidiary drive wheels of the vehicle and a generator driven by the engine to supply power to the motor so as to achieve a four-wheel drive state of the vehicle. In this proposed structure, the vehicle does not necessarily require a battery as a power source of the motor.

SUMMARY OF THE INVENTION

The starting acceleration performance of the above-proposed vehicle under low-friction road conditions becomes increased as the starting torque of the motor increases with the amount of electricity produced by the generator. However, each of the motor and the generator generally operates with about 60 to 90% efficiency. There thus arises an energy loss during the conversion of engine mechanical energy into electric energy by the generator and the conversion of the electric energy into mechanical energy by the motor. The total energy efficiency of the vehicle is lowered due to such an energy loss, thereby causing deteriorations in the fuel economy of the vehicle as well as the acceleration performance of the vehicle under high-friction road conditions.

The road frictional conditions and the running resistance of the vehicle vary according to the circumstances. There are occasions when the vehicle starts by a large driving force with motor assistance under extreme road conditions (e.g. deep snow, sand, pothole and ice area conditions) and when the vehicle starts by a small driving torque under normal road conditions.

It is therefore an object of the present invention to provide a driving force control apparatus for an automotive vehicle, capable of reducing an energy loss while securing a certain level of acceleration performance at a start of the vehicle.

It is also an object of the present invention to provide a driving force control method for an automotive vehicle.

According to a first aspect of the invention, there is provided a driving force control apparatus for an automotive vehicle, comprising: an internal combustion engine to rotate main drive wheels of the vehicle by engine torque; a generator driven by the engine; a motor powered by the generator to rotate subsidiary drive wheels of the vehicle by motor torque in a four-wheel drive state; a detecting section to detect a vehicle start failure under which the vehicle has failed to make a start in response to a vehicle starting operation in the four-wheel drive state; and a motor torque characteristic changing section to change a target torque characteristic of the motor to a higher level so as to increase the motor torque upon detection of the vehicle start failure.

According to a second aspect of the invention, there is provided a driving force control apparatus for an automotive vehicle, comprising: an internal combustion engine to rotate main drive wheels of the vehicle by engine torque; a generator driven by the engine; a motor powered by the generator to rotate subsidiary drive wheels of the vehicle by motor torque in a four-wheel drive state; and a controller to control the engine, the generator and the motor, the controller having: means for detecting a vehicle start failure under which the vehicle has failed to make a start in response to a vehicle starting operation in the four-wheel drive state; means for providing a target torque characteristic of the motor; means for changing the target motor torque characteristic to a higher level upon detection of the vehicle start failure; means for calculating a target motor torque value according to the changed target motor torque characteristic; and means for adjusting the motor torque to the target motor torque value.

According to a third aspect of the invention, there is provided a driving force control method for an automotive vehicle, the vehicle having an internal combustion engine to rotate main drive wheels of the vehicle by engine torque, a generator driven by the engine and a motor powered by the generator to rotate subsidiary drive wheels of the vehicle by motor torque in a four-wheel drive state, the method comprising: detecting a vehicle start failure under which the vehicle has failed to make a start in response to a vehicle starting operation in the four-wheel drive state; providing a target torque characteristic of the motor; changing the target motor torque characteristic to a higher level upon detection of the vehicle start failure; calculating a target motor torque value according to the changed target motor torque characteristic; and adjusting the motor torque to the target motor torque value.

The other objects and features of the invention will also become understood from the following description.

DESCRIPTION OF THE EMBODIMENTS

The invention will be described below with reference to the drawings.

Figure 1:
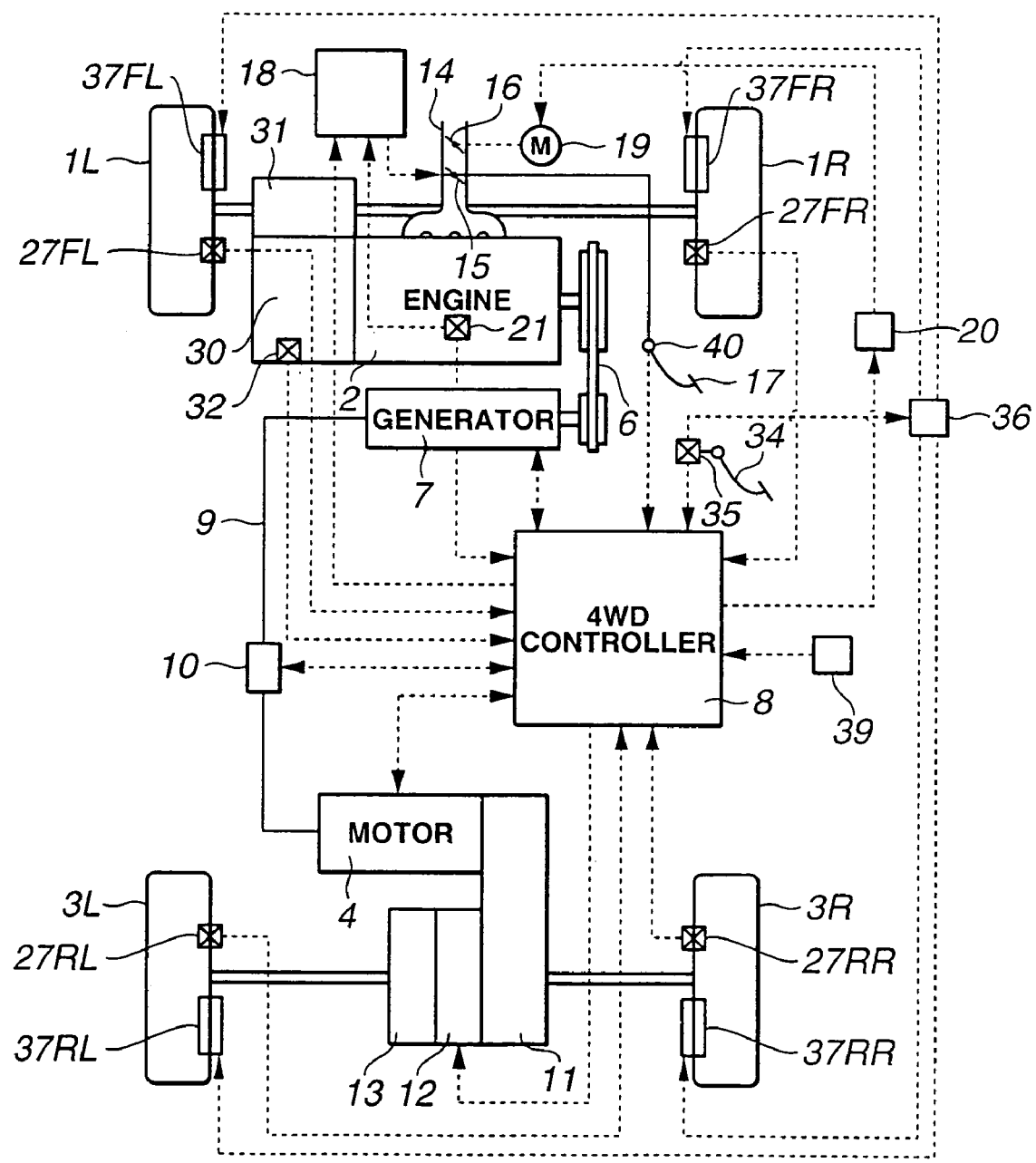
FIG. 1 is a block diagram of an automotive vehicle having a driving force control apparatus according one exemplary embodiment of the invention.
Figure 2:
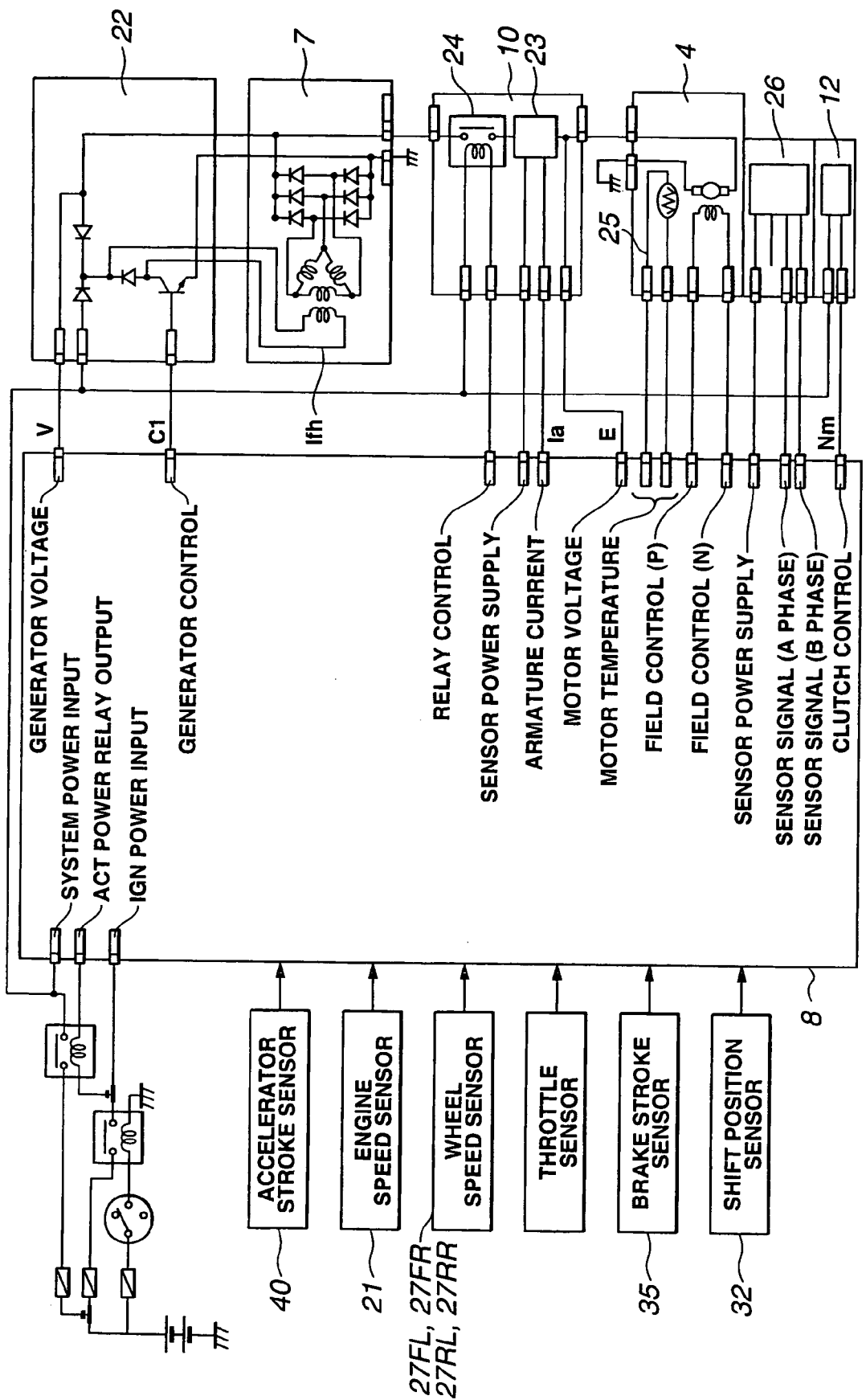
FIG. 2 is a block diagram of the driving force control apparatus according to one exemplary embodiment of the invention.

As shown in FIGS. 1 and 2, there is provided a vehicle with a driving force control apparatus including engine 2, transmission 30, electric motor 4, electric generator 7, a brake with brake pedal 34 and braking units 37FL, 37FR, 37RL and 37RR, drive mode switch 39 and various control modules such as engine controller 18, a transmission controller, motor controller 20, brake controller 36 and 4WD controller 8 according to one embodiment of the present invention. It should be noted that the vehicle of the present embodiment is designed as a four-wheel drive vehicle having front left and right wheels 1L and 1R as main drive wheels rotated by the driving force from engine 2, rear left and right wheels 3L and 3R as subsidiary drive wheels rotated by the driving force from motor 4 and accelerator pedal 17 as an acceleration indication unit (or accelerator opening indication unit) operated by a vehicle driver.

Accelerator stroke sensor 40 is provided adjacent to accelerator pedal 17 to detect the amount θ of stroke of accelerator pedal 17 (hereinafter referred to as "accelerator opening"), and is connected with 4WD controller 8 and engine controller 18 so that each of 4WD controller 8 and engine controller 18 receives a detection signal responsive to the accelerator opening θ from accelerator stroke sensor 40.

Engine 2 is drivingly connected to front wheels 1L and 1R through transmission 30 and differential gears 31 so as to rotate front wheels 1L and 1R by engine torque Te. Main throttle valve 15 and sub throttle valve 16 are provided in intake passage 14 (such as an intake manifold) of engine 2. Main throttle valve 15 operates under a control command from engine controller 18 in such a manner that the opening of main throttle valve 15 changes mechanically in response to the accelerator opening θ. Alternatively, the opening of main throttle valve 15 may be changed electrically by engine controller 18 based on the detection signal from accelerator stroke sensor 40. Stepping motor 19 is provided to actuate sub throttle valve 16 under a control command from motor controller 20, and then, sub throttle valve 16 operates in such a manner that the opening α of sub throttle valve 16 changes in response to the rotations of stepping motor 19 i.e. the step number of stepping motor 19. A throttle sensor is provided adjacent to sub throttle valve 16 to detect the opening of sub throttle valve 16 such that feedback control is performed on the step number of stepping motor 19 according to the opening of sub throttle valve 16. In order to control the output torque Te of engine 2 irrespective of a driver's accelerator pedal operation, the opening of sub throttle valve 16 is made smaller than or equal to the opening of main throttle valve 15. Engine speed sensor 21 is further provided to detect the rotational speed Ne of engine 2 (hereinafter just referred to as an "engine speed") and is connected with 4WD controller 8 and engine controller 18 so that each of 4WD controller 8 and engine controller 18 receives a detection signal responsive to the engine speed Ne from engine speed sensor 21.

Transmission 30 operates under a gear shift command from the transmission controller so as to perform a gear shift operation. Herein, the transmission controller stores a shift diagram that defines gear shift schedule based on e.g. the vehicle traveling speed Vv and the accelerator opening θ in tabular form so that the gear shift command is outputted to transmission 30 upon deciding on a shift position in the shift diagram according to the current values of the vehicle speed Vv and the accelerator opening θ. Shift position sensor 32 is provided in transmission 30 to detect a current shift position of transmission 30 and is connected with 4WD controller 8 such that 4WD controller 8 receives a detection signal from shift position sensor 32 responsive to the current shift position of transmission 30.

Brake stroke sensor 35 is provided adjacent to brake pedal 34 to detect the amount of stroke of brake pedal 34 and is connected with 4WD controller 8 and brake controller 36 so that each of 4WD controller 8 and brake controller 36 receives a detection signal from brake stroke sensor 35 responsive to the stroke amount of brake pedal 34. Braking units 37FL, 37FR, 37RL and 37RR (such as disk brakes) operate under a control command from brake controller 36 to apply braking forces on vehicle wheels 1L, 1R, 3L and 3R, respectively, according to the stroke amount of brake pedal 34.

A part of the engine torque Te is transferred to generator 7 through pulley and belt configuration 6.

Upon receipt of the engine torque Te, generator 7 becomes driven at a rotational speed Nh (hereinafter referred to as a "generator speed"). Herein, the generator speed Nh can be given as a product of the engine speed Ne and the pulley ratio of pulley and belt configuration 6. As shown in FIG. 2, generator 7 has voltage regulator 22 to regulate the output voltage V of generator 7 under a generator control command from 4WD controller 8. In the present embodiment, voltage regulator 22 receives a duty ratio C1 (as the generator control command) from 4WD controller 8, adjust the field current Ifh of generator 7 according to the duty ratio C1 and thereby regulate the output V (i.e. electricity production load voltage) of generator 7 with respect to the input from engine 2. Voltage regulator 22 also detects the output voltage V of generator 7 and outputs a detection signal responsive to the generator output V to 4WD controller 8.

The electric power V is supplied from generator 7 to motor 4 through electric wire 9.

Junction box 10 is positioned in the middle of electric wire 9. Current sensor 23 is provided injunction box 10 to detect the armature current Ia of motor 4 (i.e. the current of electricity V supplied from generator 7 to motor 4 through electric wire 9), and is connected with 4WD controller 8 so that 4WD controller 8 receives a detection signal responsive to the armature current Ia from current sensor 23. The induction voltage E of motor 4 (i.e. the voltage applied to motor 4 through electric wire 9) is monitored with 4WD controller 8. Further, relay (such as 42V relay) 24 is provided in junction box 10 so as to allow or interrupt the application of the voltage (current) to motor 4 under a relay control command from 4WD controller 8.

Motor 4 operates with the power V from generator 7 under a motor control command from 4WD controller 8 such that the field current Ifm of motor 4 is regulated to adjust the driving torque of motor 4 to a target motor torque Tm. A drive shaft of motor 4 is drivingly connected to rear wheels 3L and 3R through speed reducer 11, clutch 12 and differential gear 13 so as to rotate rear wheels 3L and 3R by the motor driving torque. Thermistor 25 and motor speed sensor 26 are provided in motor 4 to detect the temperature of motor 4 (hereinafter just referred to as a "motor speed") and the rotational speed of the drive shaft motor 4 (hereinafter just referred to as a "motor speed") so that 4WD controller 8 receives detection signals responsive to the motor temperature and the motor speed from thermistor 25 and motor speed sensor 26, respectively.

Further, wheel speed sensors 27FL, 27FR, 27RL and 27RR are provided adjacent to vehicle wheels 1L, 1R, 3L and 3R to detect the respective rotational speeds Vw of vehicle wheels 1L, 1R, 3L and 3R (hereinafter just referred to as "wheel speeds") and connected with 4WD controller 8 so that 4WD controller 8 receives pulse signals responsive to the detected wheel speeds Vw from wheel speed sensors 27FL, 27FR, 27RL and 27RR, respectively.

Drive mode switch 37 selects a drive mode of the vehicle from 4WD mode (i.e. motor drive requesting mode) and 2WD mode (i.e. motor drive unrequesting mode) according to driving conditions of the vehicle and outputs a mode selection command responsive to the selected vehicle drive mode.

When the vehicle drive mode switches to 4WD mode by the operation of drive mode switch 39, 4WD controller 8 becomes actuated to perform four-wheel drive control so as to achieve a four-wheel drive state of the vehicle.

Figure 3:
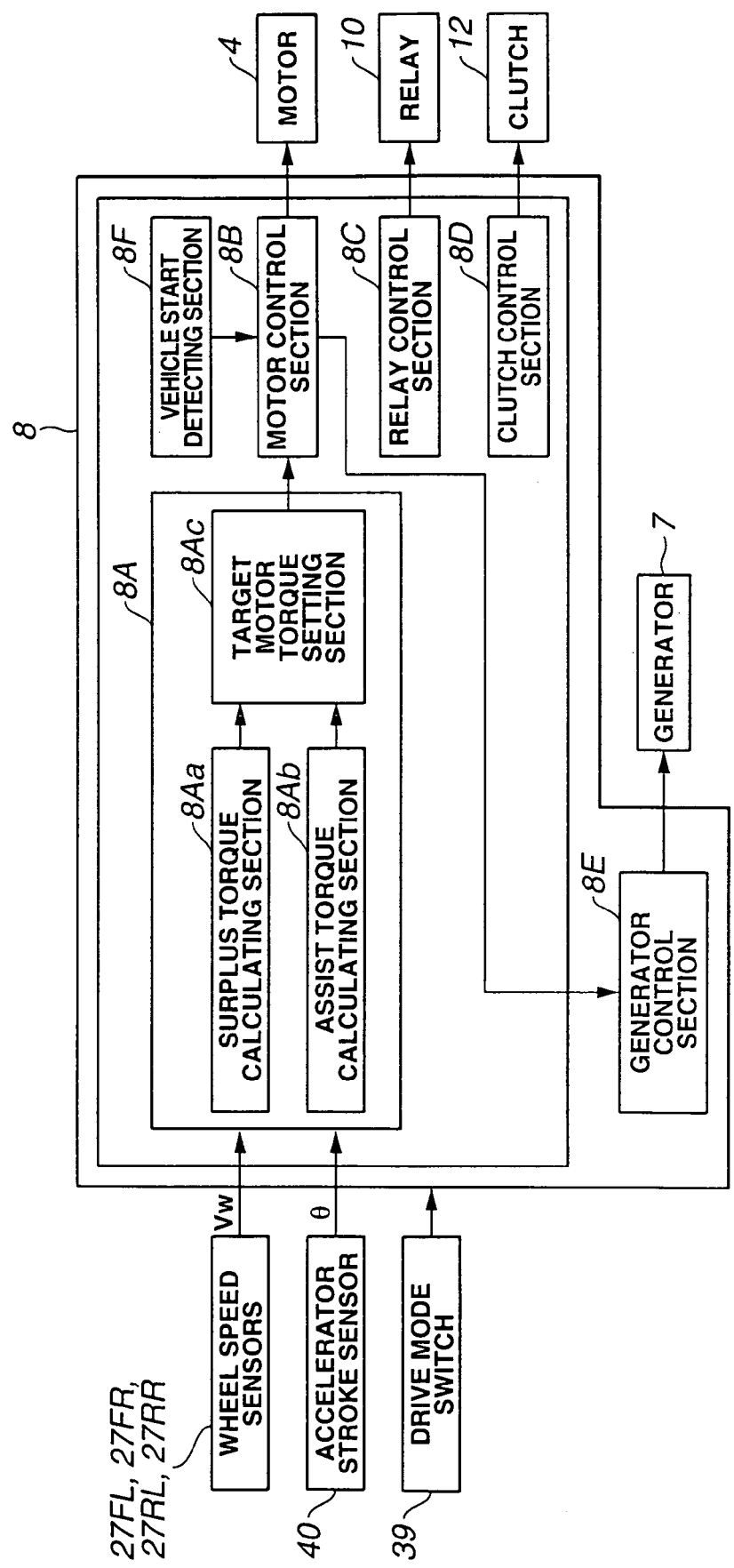
FIG. 3 is a block diagram of a 4WD controller of the driving force control apparatus according to one exemplary embodiment of the invention.

As shown in FIG. 3, 4WD controller 8 includes target motor torque calculating block 8A with surplus torque calculating section 8Aa, acceleration assist torque calculating section 8Ab and target motor torque setting section 8Ac, motor control section 8B, relay control section 8C, clutch control section 8D, generator control section 8E and vehicle start detecting section 8F.

Relay control section 8C controls the electricity supply from generator 7 to motor 4. In the present embodiment, relay control section 8C is programmed to hold relay 24 in a connecting state during the selection of 4WD mode.

Clutch control section 8D controls the engagement and disengagement of clutch 12 and is programmed to engage clutch 12 during the selection of 4WD mode in the present embodiment.

Figure 7:
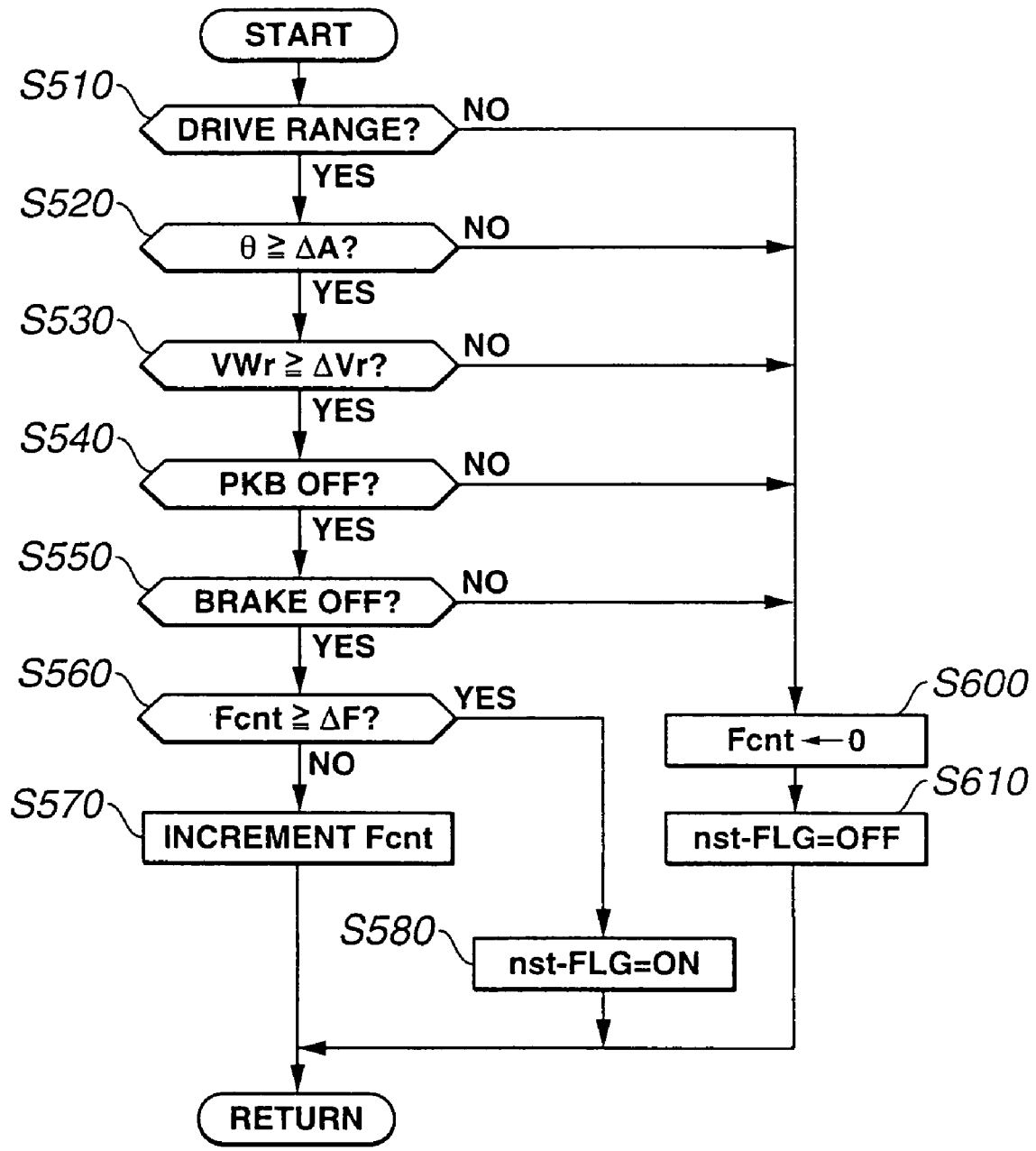
FIG. 7 is a flowchart of a vehicle start failure detection program executed by the 4WD controller according to one exemplary embodiment of the invention

Vehicle start detecting section 8F executes the following vehicle start failure detection program at established sampling times, as shown in FIG. 7, so as to detect a vehicle start failure under which the vehicle has failed to make a start in the four-wheel drive state even though there was made a vehicle starting operation upon the selection of 4WD mode.

First, vehicle start detecting section 8F reads the current shift position of transmission 3 from shift position sensor 32 and judges whether transmission 30 is in a drive range rather than a non-drive range, such as Parking or Neutral, at step S510. If transmission 30 is in the drive range (Yes at step S510), the program control proceeds to step S520. If transmission 30 is in the non-drive range (No at step S510), the program control proceeds to step S600.

At step S520, vehicle start detecting section 8F judges whether the accelerator opening θ is larger than or equal to a given accelerator opening threshold ΔA. The accelerator opening threshold ΔA corresponds to a lower limit of accelerator opening (e.g. ½) at which the driver's intention to accelerate the vehicle is recognizable. If θ≧ΔA (Yes at step S520), the program control proceeds to step S530. If θ<ΔA (No at step S520), the program control proceeds to step S600.

At step S530, vehicle start detecting section 8F judges whether the average wheel speed Vwr of rear wheels 3L and 3R is lower than or equal to a given wheel speed threshold ΔVr. Alternatively, the vehicle may be provided with a vehicle speed sensor to determine the vehicle speed Vv by actual measurement so as to allow vehicle start detecting section 8F to judge whether the measured vehicle speed Vv is lower than or equal to a given threshold although the vehicle traveling speed Vv is determined based on the wheel speeds Vw of rear wheels 3L and 3R by a known method in the present embodiment. In this case, the influence of the acceleration slip of rear wheels 3L and 3R can be suppressed. The wheel speed threshold ΔVr (or the vehicle speed threshold) is set to an upper limit of extremely low speed driving (e.g. 0.1 to 5 km/h) at which the vehicle is assumed to be at a standstill or stuck. If Vwr≦ΔVr (Yes at step S540), the program control proceeds to step S540. If Vwr>ΔVr (No at step S540), the program control proceeds to step S600.

At step S540, vehicle start detecting section 8F judges whether the parking brake PBK of the vehicle is placed in the OFF position. If the parking brake PBK is OFF (Yes at step S540), the program control proceeds to step S550. If the parking brake PBK is ON (No at step S540), the program control proceeds to step S600.

At step S550, vehicle start detecting section 8F judges, based on the stroke of brake pedal 43 etc., whether the brake (including braking units 37FL, 37FR, 37RL and 37RR) is in operation. If the brake is OFF (Yes at step S550), the program control proceeds to step S560. If the brake is ON (No at step S550), the program control proceeds to step S600.

At step S560, vehicle start detecting section 8F judges whether a counter Fcnt is set higher than or equal to a given value ΔF, i.e., whether the vehicle start failure has occurred for a lapse of a predetermined time period (e.g. 1 second) after the vehicle starting operation. If Fcnt<ΔF (No at step S560), the program control proceeds to step S570. If Fcnt≧ΔF (Yes at step S560), the program control proceeds to step S580.

At step S570, vehicle start detecting section 8F increments the counter Fcnt. After that, the control exits from the program.

At step S580, vehicle start detecting section 8F set a failure indication flag NST-FLG to the ON position, so as to indicate the occurrence of the vehicle start failure. After that, the control exits from the program.

At step S600, vehicle start detecting section 8F sets the counter Fcnt to zero. The program control then proceeds to step S601.

At step S610, vehicle start detecting section sets the flag NST-FLG to the OFF position. After that, the control exits from the program. The failure indication flag NST-FLG is held at the OFF position when the vehicle comes to a stop, is in an initial state of the vehicle starting operation or runs at a given speed.

Concurrently, target motor torque calculating block 8A calculates a target motor torque Tm as follows.

Figure 4:
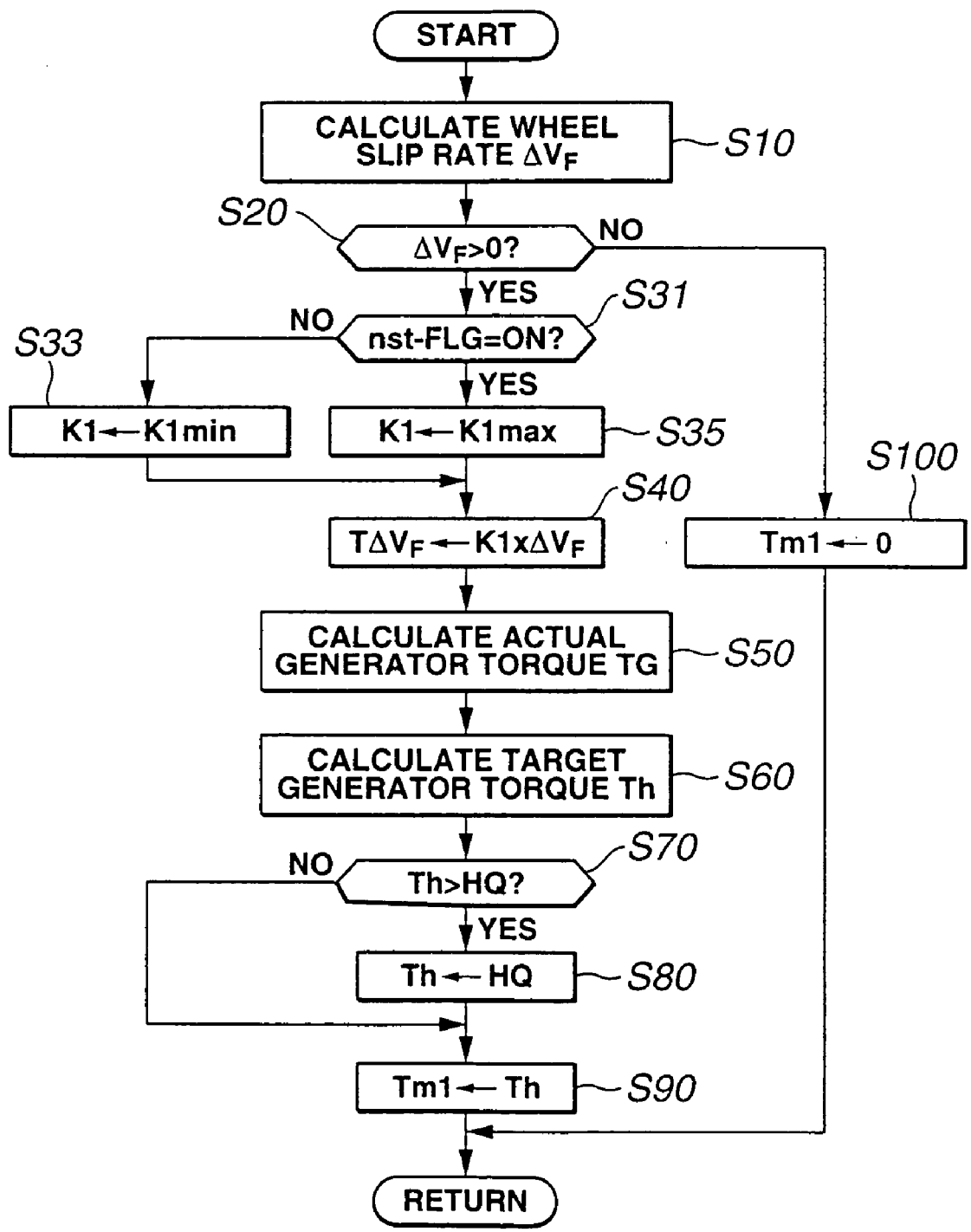
FIG. 4 is a flowchart of a surplus engine torque calculation program executed by the 4WD controller according to one exemplary embodiment of the invention.

Surplus torque calculating section 8Aa executes the following surplus engine torque calculation program based on the inputted detection signals at established sampling times, as shown in FIG. 4, so as to calculate a surplus torque of engine 2 according to the acceleration slip of front wheels 1L and 1R and determine a first target motor torque Tm1 based on the surplus engine torque.

First, surplus torque calculating section 8Aa reads the respective wheel speeds Vw of vehicle wheels 1L, 1R, 3L and 3R from wheel speed sensors 27FL, 27FR, 27RL and 27LL and determines, based on these wheel speeds Vw, a slip rate $\Delta V_F$ corresponding to the amount ΔV of acceleration slip of front wheels 1L and 1R at step S10. In the present embodiment, the wheel slip rate $\Delta V_F$ is given by subtracting the average wheel speed Vwr of rear wheels 3L and 3R from the average wheel speed Vwf of front wheels 1L and 1R according to the following equation (1):

$$\Delta V_F = Vwf - Vwr \qquad (1).$$

Surplus torque calculating section 8Aa next judges whether the slip rate $\Delta V_F$ is higher than a given slip rate threshold at step S20. In the present embodiment, the slip rate threshold is set to zero. If $\Delta V_F > 0$ (Yes at step S20), the program control proceeds to step S31 by deciding on the occurrence of acceleration slip of front wheels 1L and 1R. If $\Delta V_F \leq 0$ (No at step S20), the program control proceeds to step S100 by deciding on the nonoccurrence of acceleration slip of front wheels 1L and 1R.

At step S31, surplus torque calculating section 8Aa judges whether the vehicle start failure has occurred during the predetermined time period after the vehicle starting operation, i.e., whether the failure indication flag NST-FLG is ON. If NST-FLG=OFF (No at step S31), the program control proceeds to step S33. If NST-FLG=ON (Yes at step S31), the program control proceeds to step S35.

At step S33, surplus torque calculating section 8Aa sets a torque gain K1 to a specified gain value K1min.

At step S35, surplus torque calculating section 8Aa sets a torque gain K1 to a gain value K1max.

The gain value K1 is used to calculate an absorption torque $T\Delta V_F$ for limiting the acceleration slip of front wheels 1L and 1R, and the gain values K1min and K1max are predetermined e.g. by experiment. In the present embodiment, there is a relationship of K1max>K1min. The gain value K1min is given in such a manner that the absorption torque $T\Delta V_F$, when calculated upon setting of K1 to K1min, becomes exact torque required to limit the acceleration slip of front wheels 1L and 1R. The gain value K1max is given in such a manner that the absorption torque $T\Delta V_F$, when calculated upon setting of K1 to K1max, becomes higher than the exact torque required to limit the acceleration slip of front wheels 1L and 1R. It is herein noted that the above processes of steps S31 to S35 constitutes a motor torque characteristic changing section or means in the present embodiment.

At step S40, surplus torque calculating section 8Aa calculates the absorption torque $T\Delta V_F$ according to the equation (2):

$$T\Delta V_F = K1 \times \Delta V_F \quad (2).$$

At step S50, surplus torque calculating section 8Aa determines a load torque TG presently applied to generator 7 according to the following equation (3):

$$TG = K2 \times (V \times Ia)/(K3 \times Nh) \quad (3)$$

where V is the output voltage of generator 7; Ia is the armature current of generator 7; Nh is the rotational speed of generator 7; K3 is the efficiency of generator 7; and K2 is the absorption torque calculation factor.

At step S60, surplus torque calculating section 8Aa determines a surplus engine torque that substantially corresponds to a magnitude of difference by which the torque transferred from engine 2 to front wheels 1L and 1R exceeds a road reaction force limit torque of front wheels 1L and 1R, i.e., a load torque Th to be applied to generator 7 according to the following equation (4):

$$Th = TG + T\Delta V_F \quad (4)$$

At step S70, surplus torque calculating section 8Aa judges whether the generator load torque Th is higher than a maximum load capacity HQ of generator 7. The maximum motor load capacity HQ is generally determined based on the specifications etc. of generator 7. If Th>HQ (Yes at step S70), the program control proceeds to step S80. If Th≦HQ (No at step S70), the program control proceeds to step S90.

At step S80, surplus torque calculating section 8Aa limits the generator load torque Th to the maximum load capacity HQ. The program control then proceeds to step S90.

At step S90, surplus torque calculating section 8Aa determines the generator load torque Th as a first target motor torque Tm1. The control then exits from the program.

At step S100, surplus torque calculating section 8Aa sets the first target motor torque Tm1 to zero. The control then exits from the program.

As explained above, the characteristic of the first target motor torque Tm1 is initially set to a moderately low level at which the vehicle is allowed to make a smooth start under normal road conditions conceivable in daily life and changed to a higher level at which the vehicle is allowed to start even under extreme road conditions of deep snow, sand, pothole and ice areas etc. where the running resistance of the vehicle is high upon detection of the occurrence of the vehicle start failure.

Although the first target motor torque Tm1 is calculated from the generator load torque TG in consideration of the acceleration slip amount $\Delta V$ of front wheels 1L and 1R in the present embodiment, it may alternatively be possible to adjust a torque gain factor depending on whether the failure indication flag NST-FLG is ON or OFF, and then, calculate the first target motor torque Tm1 directly upon multiplying the acceleration slip amount $\Delta V$ of front wheels 1L and 1R by the adjusted gain factor.

By contrast, assist torque calculating section 8Ab sets a second target motor torque Tm2 based on the vehicle speed Vv and the accelerator opening θ.

Figure 5A:
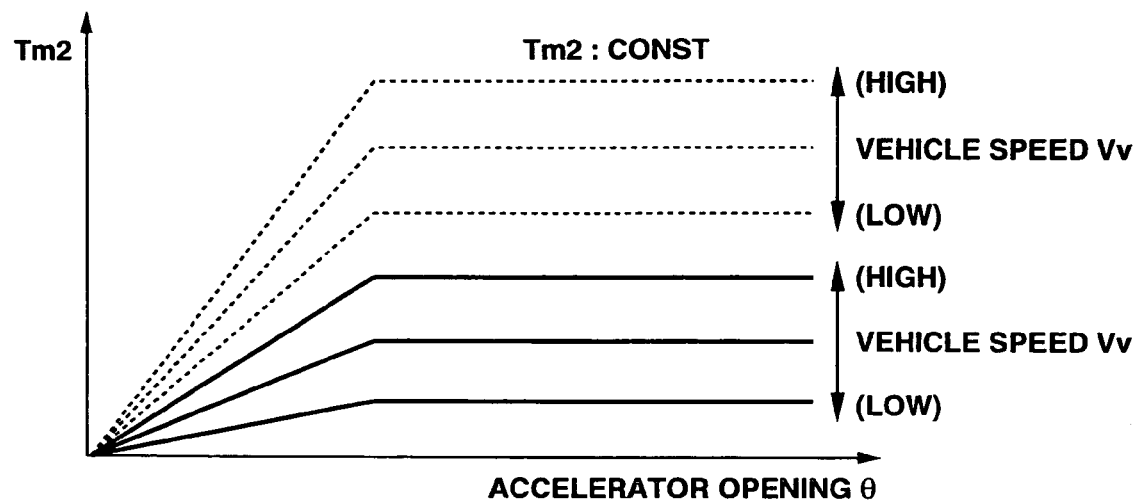
FIGS. 5A and 5B are maps showing a characteristic of target motor torque with respect to accelerator opening and vehicle traveling speed, respectively, according to one exemplary embodiment of the invention.
Figure 5B:
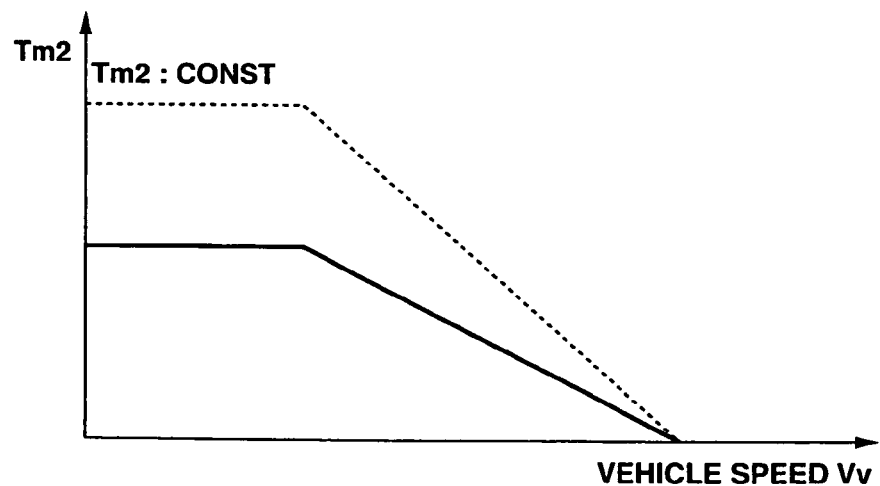

As shown in FIGS. 5A and 5B, the second target motor torque Tm2 increases with the accelerator opening θ and decreases with the vehicle speed Vv. Further, the second target motor torque Tm2 is set to zero as shown in FIG. 5B when the vehicle speed Vv is higher than or equal to a given vehicle speed threshold. The vehicle speed threshold is herein set to a lower limit of vehicle speed at which the vehicle is assumed to exit from a starting state.

The characteristic of the second target motor torque Tm2 varies as shown by solid lines in FIGS. 5A and 5B at the time of NST-FLG=OFF and by broken lines in FIGS. 5A and 5B at the time of NST-FLG=ON. Further, the peak of the second target motor torque Tm2 at the time of NST-FLG=OFF (designated as "T2: CONST" by the solid lines in FIGS. 5A and 5B) corresponds to a torque value by which the vehicle is allowed to make a smooth start under normal road conditions. The peak of the second target motor torque Tm2 at the time of NST-FLG=ON (designated as "T2: CONST" by the broken lines in FIGS. 5A and 5B) corresponds to a maximum system torque by which the vehicle is allowed to start off even under extreme road conditions of deep snow, sand, pothole and ice areas etc. where the running resistance of the vehicle is high.

As explained above, the characteristic of the second target motor torque Tm2 is also initially set to a moderately low level and changed to a higher level with respect to the accelerator opening θ upon detection of the occurrence of the vehicle start failure. It is herein noted that the above change of the characteristic of the second target motor torque Tm2 also constitutes a motor torque characteristic changing section or means in the present embodiment. The characteristic of the second target motor torque Tm2 may not be changed by ON/OFF switching of the failure indication flag NST-FLG.

Target motor torque setting section 8Ac selects a higher value of the first and second target motor torques Tm1 and Tm2 as the final target motor torque Tm and outputs the final target motor torque Tm to motor control section 8B.

Figure 6:
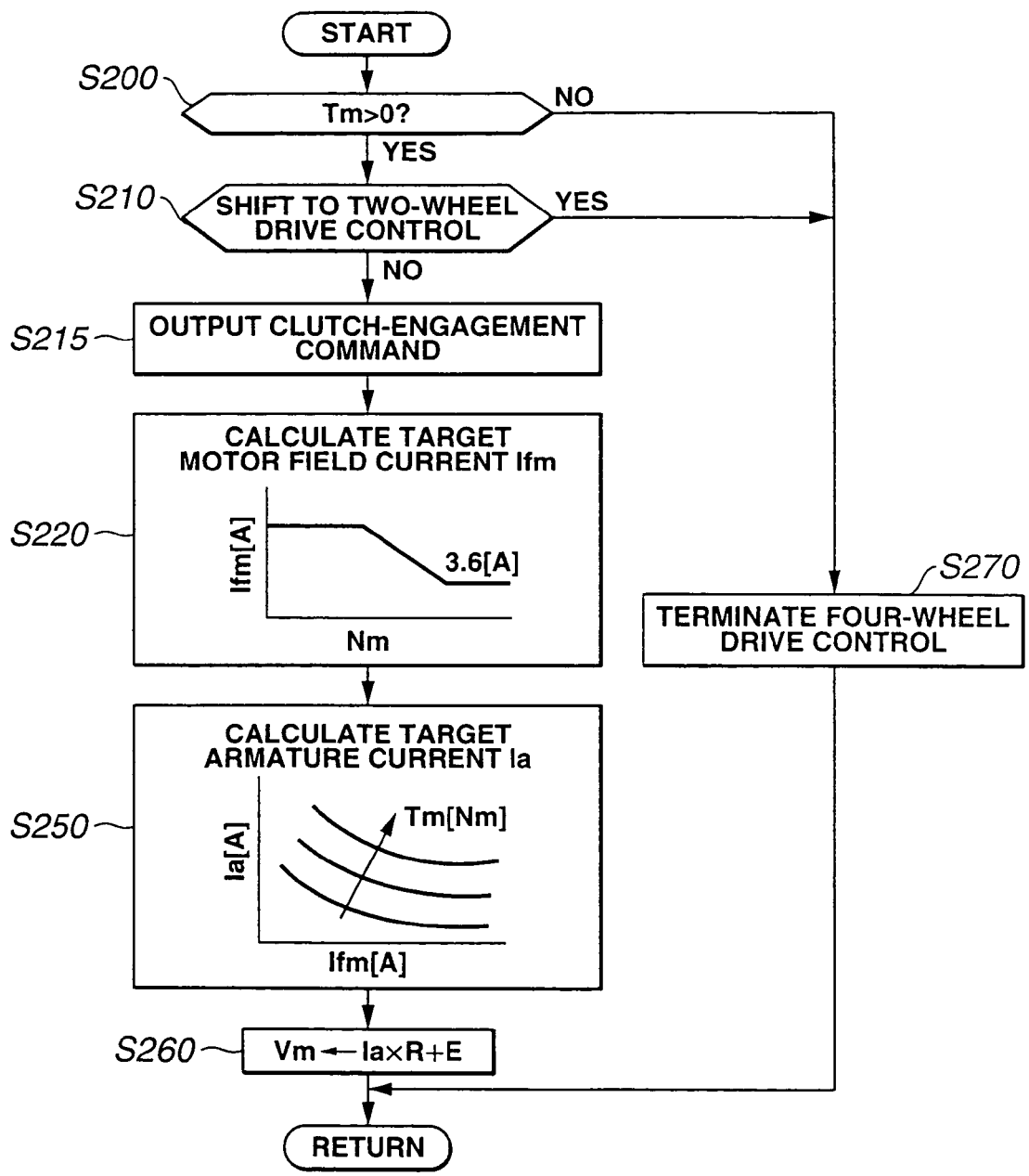
FIG. 6 is a flowchart of a motor control program executed by the 4WD controller according to one exemplary embodiment of the invention.

In response to the input of the final target motor torque Tm from target motor torque setting section 8Ac, motor control section 8B executes the following motor control program at establish sampling times, as shown in FIG. 6, so as to control the operation of motor 4.

Motor control section 8B first judges whether the target motor torque Tm is higher than zero at step S200. If Tm>0 (Yes at step S200), the program control proceeds to step S210 upon judging that the vehicle is in 4WD mode (where the acceleration slip of front wheels 1L and 1R may occur). If Tm≦0 (No at step S200), the program control proceeds to step S270 upon judging that the vehicle is not in 4WD mode.

At step S210, motor control section 8B judges whether the vehicle shifts into two-wheel drive control. The shift of the vehicle into two-wheel drive control can be judged e.g. when the motor speed Nm approaches an allowable rotational speed limit of motor 4 or when transmission 30 is placed in the non-drive range such as Parking or Neutral. If the vehicle shifts into two-wheel drive control (Yes at step S210), the program control proceeds to step S270. If the vehicle is in four-wheel drive control (No at step S210), the program control proceeds to step S215.

At step S215, motor control section 8B outputs a clutch engagement command to clutch control section 8D and thereby causes clutch control section 8D to engage clutch 12. The program control then proceeds to step S220.

At step S220, motor control section 8B reads the motor speed Nm from motor speed sensor 26 and determines a target value of the motor field current Ifm according to the motor speed Nm. In the present embodiment, feedback control is performed on the motor field current Ifm based on the difference between the actual value and the target value of the motor field current Ifm. The program control then proceeds to step S250.

In the present embodiment, motor control section 8B stores therein a motor field current characteristic map, which defines a correlation of the target value of the motor filed current Ifm with the motor speed Nm as shown in FIG. 6, and determines the target value of the motor filed current Ifm based on the present actual motor speed Nm with reference to the motor field current characteristic map. The target value of the motor field current Ifm is kept constant when the motor speed Nm is lower than or equal to a given motor speed threshold Nmth. When the motor speed Nm is higher than the motor speed threshold Nmth, the target value of the motor field current Ifm is decreased to a given level by a known field weakening-control method. The motor torque generally decreases with increase in the motor induction voltage E during the high-speed running of motor 4. In the present embodiment, however, it is possible to prevent the motor torque from decreasing and secure the motor torque at a desired level by decreasing the motor field current Ifm and thereby decreasing the motor induction voltage E even when the motor speed exceeds the threshold value Nmth. It is further possible to reduce the complexity of the electronic circuit of motor control section 8B and its cost by controlling the motor field current Ifm in two stages (where Nm≧Nmth and where Nm<Nmth) as compared with the case of controlling the motor field current Im continuously.

Alternatively, motor control section 8B may have a motor torque correcting section capable of adjusting the motor field current Ifm according to the motor speed Nm so as to correct the motor torque continuously. This makes it possible to provide a smooth characteristic of the motor and achieve a more stable vehicle running and constantly high motor efficiency while preventing an increase in the motor induction voltage E and securing the motor torque at a desired level even during the high-speed running of motor 4.

At step S250, motor control section 8B determines a target value of the armature current Ia based on the target motor torque Tm and the target motor field current Ifm. In the present embodiment, motor control section 8B stores therein an armature current characteristic map, which defines a correlation of the target value of the armature current Ia with the target motor torque Tm and the tartget value of the motor field current Ifm a shown in FIG. 6, and determines the target value of the armature current Ia with reference to the armature current characteristic map. After that, the program control proceeds to step S260.

At step S260, motor control section 8B calculates a target generator output voltage Vm according to the following equation (5) and outputs the calculated target generator output voltage Vm to generator control section 8E:

$$Vm = Ia \times R + E \tag{5}$$

where Ia is the target armature current; E is the induction voltage of motor 4; and R is the resistance between motor 4 and generator 7. After that, the control exits from the program.

At step S270, motor control section 8B terminates the four-wheel drive control of the vehicle and outputs various two-wheel drive control commands to shift the vehicle into two-wheel drive control. Herein, the two-wheel drive control commands includes a clutch disengagement command to cause clutch control section 8D to disengage clutch 12 and an electricity production stop command to cause generator 7 to stop electricity production by setting the target value of the generator output voltage V (i.e. the generator output torque) to zero. After that, the control exits from the program.

In response to the input of the target generator output voltage Vm from motor control section 8B, generator control section 8E reads the present actual load voltage V of generator 7, generates a generator control command (i.e. duty ratio) C1 to adjust the actual generator voltage V to the target generator voltage Vm and thereby cause voltage regulator 22 to regulate the field current Ifh of generator 7 according to the generator control command.

Figure 8:
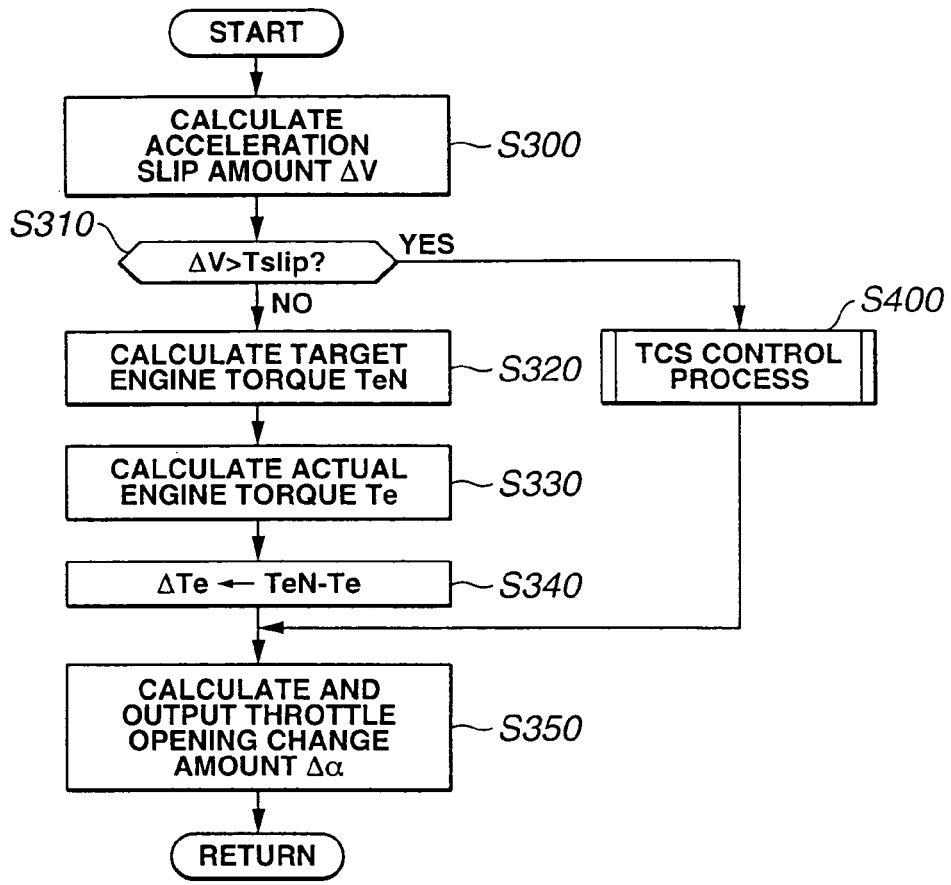
FIG. 8 is a flowchart of an engine control program executed by the 4WD controller according to one exemplary embodiment of the invention.

Engine controller 18 executes the following engine control program at established sampling times based on the inputted detection signals, as shown in FIG. 8, so as to control the operation of engine 2.

First, engine controller 18 determines the acceleration slip amount ΔV of front wheels 1L and 1R (as main drive wheels) at step S300. The determination method of the acceleration slip amount ΔV of front wheels 1L and 1R is not particularly restricted, and the acceleration slip amount ΔV of front wheels 1L and 1R can be determined by a known method.

Next, engine controller 18 judges whether the acceleration slip amount ΔV of front wheels 1L and 1R exceeds a target acceleration slip amount Tslip at step S310. If ΔV>Tslip (Yes at step S310), the program control proceeds to step S400. If ΔV≦Tslip (No at step S310), the program control proceeds to step S320. The target acceleration slip amount Tslip is set to e.g. about 10% in terms of slip ratio.

At step S320, engine controller 18 calculates a target engine output torque TeN desired by the vehicle driver based on the detection signal θ from accelerator stroke sensor 40. After that, the program control proceeds to step S670.

At step S330, engine controller 18 calculates a present actual engine output torque Te based on the present actual values of the throttle openings and the engine speed Ne.

At step S340, engine controller 18 calculates a deviation ΔTe between the actual engine output torque Te and the target engine output torque TeN according to the following equation (6):

$$\Delta Te = TeN - Te \tag{6}$$

Further, engine controller 18 performs so-called TCS control on engine 2 to substitute a change of TCS torque into the engine torque deviation ΔTe at step S400.

At step S350, engine controller 18 calculates the amount Δα of change in throttle opening α corresponding to the engine output deviation ΔTe and generates a throttle control signal responsive to the throttle opening change amount Δα to motor controller 20 so as to drive stepping motor 19 and cause throttle valve 16 to adjust the throttle opening α according to the throttle control signal. After that, the control exits from the program.

For the sake of clarity, the throttle control signal is outputted responsively to the throttle opening change amount Δα so as to adjust the engine torque Te in the above explanation. In practice, however the engine torque Te is adjusted by a predetermined engine torque increment or decrement amount at every activation in order to control the engine torque Te smoothly.

The workings of the above-structured vehicle driving force control apparatus will be explained below. It is now assumed that drive mode switch 30 is switched to 4WD mode.

When the acceleration slip of front wheels 1L and 1R does not occur at a start of the vehicle, 4WD controller 8 determines the target motor torque Tm2 as Tm according to the accelerator opening θ and the vehicle speed Vv and controls motor 4 and generator 7 in such a manner as to achieve the target motor torque Tm (=Tm2). When the acceleration slip of front wheels 1L and 1R occurs at a start of the vehicle due to a low-friction road condition or a hard depression of accelerator pedal 17, on the other hand, 4WD controller 8 determines the first target motor torque Tm1 according to the acceleration slip amount ΔV of front wheels 1L and 1R, determines the second target motor torque Tm2 according to the accelerator opening θ and the vehicle speed Vv, selects the higher value of the target motor torques Tm1 and Tm2 as Tm, and then controls motor 4 and generator 7 in such a manner as to achieve the selected target motor torque Tm (=Tm1 or Tm2). The vehicle is therefore able to obtain an improvement in starting acceleration performance.

More specifically, the second target motor torque Tm2 is selected as Tm in the case where the second target motor torque Tm2 is higher than the first target motor torque Tm1. As the characteristic of the second target motor torque Tm2 is initially set to a moderately low level, it is possible to reduce an energy loss at the start of the vehicle by selecting such a moderately low target motor torque Tm2 as Tm. In the case where the first target motor torque Tm1 is higher than the second target motor torque Tm2, the first target motor torque Tm1 is selected as Tm. As the characteristic of the first target motor torque Tm1 is also initially set to a moderately low level such that motor 4 receives power output from generator 7 substantially corresponding to the surplus engine torque (i.e. the surplus of engine torque over the road reaction force limit torque of front wheels 1L and 1R), it is possible to improve the total energy efficiency of the vehicle and reduce an energy loss by selecting the target motor torque Tm1 as Tm.

Figure 9:
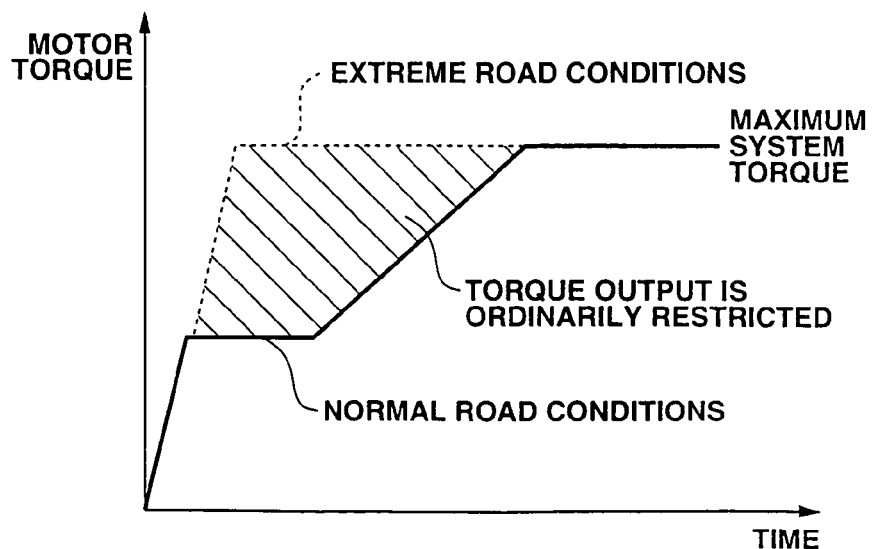
FIG. 9 is a time chart of vehicle starting control according to one exemplary embodiment of the invention.

In this way, the target motor torque Tm is set to a moderately low level at a start of the vehicle unless the vehicle start failure occurs under normal road conditions, as shown in FIG. 9, so as to limit the driving torque of motor 4 and the amount of electricity produced by generator 7 for the reduction in energy loss at the start of the vehicle.

If the characteristic of the target motor torque Tm is held at a moderately low level under extreme road conditions of deep snow, sand, pothole and ice areas where the running resistance of the vehicle is high, there is a possibility that the vehicle fails to start in response to the vehicle starting operation. In the present embodiment, however, the characteristic of the target motor torque Tm is changed to a higher level as shown in FIG. 9 when the vehicle has failed to start off during the predetermined time period contrary to the driver's intention to accelerate the vehicle. The vehicle is therefore able to obtain a further improvement in starting acceleration performance.

Herein, the probability that the vehicle encounters extreme road conditions is considerably low. The target motor torque Tm is set to a moderately low level so as to allow a reduction in energy loss at the vehicle start in most cases.

Although the target motor torque characteristic is always changed to a higher level upon detection of the vehicle start failure in the present embodiment, the driving force control apparatus is not limited to such a configuration. The driving force control apparatus may alternatively be configured to change the target motor torque characteristic to a higher level when accelerator pedal 17 is further depressed such that the driver's intention to accelerate the vehicle is apparently recognized, i.e., when the accelerator opening θ is further increased to exceed a given threshold value, upon detection of the vehicle start failure. In this case, the restriction on the torque output of motor 4 is removed by ensuring the driver's intention to accelerate the vehicle. This makes it possible to allow a further reduction in energy loss at the start of the vehicle.

In addition, the driving force control apparatus may alternatively be configured to determine the target motor torque Tm based only on the accelerator opening θ although the target motor torque Tm is determined in consideration of not only the vehicle speed Vv and the accelerator opening θ but also the acceleration slip amount ΔV of front wheels 1L and 1R at the occurrence of acceleration slip of front wheels 1L and 1R in the present embodiment.

In the present embodiment, the same target motor torque characteristic of motor is used at the start of the vehicle and during running of the vehicle after the vehicle start. Alternatively, the driving force control apparatus may be configured to differentiate the target motor torque characteristic at the vehicle start from the target motor torque characteristic during the vehicle running after the vehicle start.

The driving force control apparatus may be configured to determine the target motor torque Tm based on any vehicle parameter other than the accelerator opening θ although the target motor torque Tm is determined based on at least the accelerator opening θ in the present embodiment.

Further, electric motor 4 can be either a direct-current motor or an alternating-current motor.

The entire contents of Japanese Patent Application No. 2004-167913 (filed on Jun. 7, 2004) are herein incorporated by reference.

Although the present invention has been described with reference to the above-described specific embodiment of the invention, the invention is not limited to the embodiment. Various modification and variation of the embodiment described above will occur to those skilled in the art in light of the above teaching. The scope of the invention is defined with reference to the following claims.

What is claimed is:

1. A driving force control apparatus for an automotive vehicle, comprising:

an internal combustion engine to rotate main drive wheels of the vehicle by engine torque;

a generator driven by the engine;

a motor powered by the generator to rotate subsidiary drive wheels of the vehicle by motor torque in a four-wheel drive state;

a detecting section to detect a vehicle start failure under which the vehicle has failed to make a start in response to a vehicle starting operation in the four-wheel drive state; and a motor torque characteristic changing section to change a target torque characteristic of the motor to a higher level so as to increase the motor torque upon detection of the vehicle start failure.

2. The driving force control apparatus according to claim 1, wherein the torque characteristic changing section changes the target motor torque characteristic based on at least an amount of vehicle acceleration indicated by a vehicle driver.

3. The driving force control apparatus according to claim 1, wherein the torque characteristic changing section changes the target motor torque characteristic when an amount of vehicle acceleration indicated by a vehicle driver is larger than or equal to a given threshold.

4. The driving force control apparatus according to claim 1, wherein the detecting section decides on the occurrence of the vehicle start failure when either a rotational speed of the subsidiary drive wheels or a traveling speed of the vehicle is lower than a given speed level for a lapse of a predetermined time period after the vehicle starting operation.

5. A driving force control apparatus for an automotive vehicle, comprising:

an internal combustion engine to rotate main drive wheels of the vehicle by engine torque;

a generator driven by the engine;

a motor powered by the generator to rotate subsidiary drive wheels of the vehicle by motor torque in a four-wheel drive state; and a controller to control the engine, the generator and the motor, the controller having:

means for detecting a vehicle start failure under which the vehicle has failed to make a start in response to a vehicle starting operation in the four-wheel drive state;

means for providing a target torque characteristic of the motor;

means for changing the target motor torque characteristic to a higher level upon detection of the vehicle start failure;

means for calculating a target motor torque value according to the changed target motor torque characteristic; and means for adjusting the motor torque to the target motor torque value.

6. The driving force control apparatus according to claim 5, wherein the target motor torque characteristic varies according to an amount of acceleration slip of the main drive wheels.

7. The driving force control apparatus according to claim 5, further comprising means for judging whether a vehicle driver has an intention to accelerate the vehicle, wherein said changing means changes the target motor torque characteristic when the driver's intention to accelerate the vehicle is recognizable.

8. The driving force control apparatus according to claim 5, further comprising:

means for providing a second target motor torque characteristic that varies according to an accelerator opening and a traveling speed of the vehicle;

means for changing the second target motor torque characteristic to a higher level upon detection of the vehicle start failure;

means for calculating a second target motor torque value according to the changed second target motor torque characteristic; and means for selecting a higher one of the first mentioned target motor torque value and the second target motor torque value as a final target motor torque value.

9. The driving force control apparatus according to claim 5, wherein said detecting means decides on the occurrence of the vehicle start failure when either a rotational speed of the subsidiary drive wheels or a traveling speed of the vehicle is lower than a given speed level for a lapse of a predetermined time period after the vehicle starting operation.

10. A driving force control method for an automotive vehicle, the vehicle having an internal combustion engine to rotate main drive wheels of the vehicle by engine torque, a generator driven by the engine and a motor powered by the generator to rotate subsidiary drive wheels of the vehicle by motor torque in a four-wheel drive state, the method comprising:

detecting a vehicle start failure under which the vehicle has failed to make a start in response to a vehicle starting operation in the four-wheel drive state;

providing a target torque characteristic of the motor;

changing the target motor torque characteristic to a higher level upon detection of the vehicle start failure;

calculating a target motor torque value according to the changed target motor torque characteristic; and adjusting the motor torque to the target motor torque value.

11. The driving force control apparatus according to claim 2, wherein the torque characteristic changing section changes the target motor torque characteristic when an amount of vehicle acceleration indicated by a vehicle driver is larger than or equal to a given threshold.

12. The driving force control apparatus according to claim 2, wherein the detecting section decides on the occurrence of the vehicle start failure when either a rotational speed of the subsidiary drive wheels or a traveling speed of the vehicle is lower than a given speed level for a lapse of a predetermined time period after the vehicle starting operation.

13. The driving force control apparatus according to claim 3, wherein the detecting section decides on the occurrence of the vehicle start failure when either a rotational speed of the subsidiary drive wheels or a traveling speed of the vehicle is lower than a given speed level for a lapse of a predetermined time period after the vehicle starting operation.

14. The driving force control apparatus according to claim 6, further comprising means for judging whether a vehicle driver has an intention to accelerate the vehicle, wherein said changing means changes the target motor torque characteristic when the driver's intention to accelerate the vehicle is recognizable.

15. The driving force control apparatus according to claim 6, further comprising:

means for providing a second target motor torque characteristic that varies according to an accelerator opening and a traveling speed of the vehicle;

means for changing the second target motor torque characteristic to a higher level upon detection of the vehicle start failure;

means for calculating a second target motor torque value according to the changed second target motor torque characteristic; and means for selecting a higher one of the first mentioned target motor torque value and the second target motor torque value as a final target motor torque value.

16. The driving force control apparatus according to claim 7, further comprising:
- means for providing a second target motor torque characteristic that varies according to an accelerator opening and a traveling speed of the vehicle;
- means for changing the second target motor torque characteristic to a higher level upon detection of the vehicle start failure;
- means for calculating a second target motor torque value according to the changed second target motor torque characteristic; and
- means for selecting a higher one of the first mentioned target motor torque value and the second target motor torque value as a final target motor torque value.

17. The driving force control apparatus according to claim 6, wherein said detecting means decides on the occurrence of the vehicle start failure when either a rotational speed of the subsidiary drive wheels or a traveling speed of the vehicle is lower than a given speed level for a lapse of a predetermined time period after the vehicle starting operation.

18. The driving force control apparatus according to claim 7, wherein said detecting means decides on the occurrence of the vehicle start failure when either a rotational speed of the subsidiary drive wheels or a traveling speed of the vehicle is lower than a given speed level for a lapse of a predetermined time period after the vehicle starting operation.

19. The driving force control apparatus according to claim 8, wherein said detecting means decides on the occurrence of the vehicle start failure when either a rotational speed of the subsidiary drive wheels or a traveling speed of the vehicle is lower than a given speed level for a lapse of a predetermined time period after the vehicle starting operation.

20. The driving force control apparatus according to claim 1, wherein the detecting section detects the vehicle start failure based on at least one of an accelerator opening, an average wheel speed, a status of the parking brake, and the status of the brake.

21. The driving force control apparatus according to claim 5, wherein the means for detecting a vehicle start failure detects the vehicle start failure based on at least one of an accelerator opening, an average wheel speed, a status of the parking brake, and the status of the brake.

* * * * *